US007769855B2

(12) United States Patent
Vigoureux et al.

(10) Patent No.: US 7,769,855 B2
(45) Date of Patent: Aug. 3, 2010

(54) METHOD FOR SETTING UP A TWO-DIRECTIONAL CONNECTION

(75) Inventors: Martin Vigoureux, Paris (FR); Emmanuel Dotaro, Verrieres le Buisson (FR)

(73) Assignee: Alcatel Lucent, Paris (FR)

( * ) Notice: Subject to any disclaimer, the term of this patent is extended or adjusted under 35 U.S.C. 154(b) by 408 days.

(21) Appl. No.: 11/949,416

(22) Filed: Dec. 3, 2007

(65) Prior Publication Data

US 2008/0133770 A1  Jun. 5, 2008

(30) Foreign Application Priority Data

Dec. 4, 2006  (FR)  ................................. 06 55287

(51) Int. Cl.
*G06F 15/16*  (2006.01)
(52) U.S. Cl. ...................... 709/224; 709/227; 709/232; 370/231
(58) Field of Classification Search ................. 709/224, 709/226–229, 231–234, 236, 237, 246; 370/230–235
See application file for complete search history.

(56) References Cited

U.S. PATENT DOCUMENTS 5,633,861 A *   5/1997  Hanson et al. .............. 370/232
2003/0007219 A1*  1/2003  Stilling ....................... 359/166
2009/0310960 A1*  12/2009  Xu ................................ 398/4

FOREIGN PATENT DOCUMENTS

EP    1379036 A1   1/2004
EP    1578042 A1   9/2005

* cited by examiner

*Primary Examiner*—Moustafa M Meky
(74) *Attorney, Agent, or Firm*—Sughrue Mion, PLLC (57) ABSTRACT

A communication device (B) for a communication network with an IP control plane, comprises communication resources to transfer data in said network, a signaling controller capable of receiving an open connection message comprising a first traffic descriptor (11) for a down data flow to be transmitted by an initiator node (A) to a terminator node (C) and a second traffic descriptor (12) for an up data flow to be transmitted by the terminator node from the initiator node, and an admission controller capable of evaluating communication resources of the communication device available for said down flow and said up flow as a function of the first and second traffic descriptors, said signaling controller being capable of producing an updated open connection message as a function of said received open connection message and said available communication resources.

11 Claims, 4 Drawing Sheets

FIG_1

FIG_8

```
<Path Message> ::=        <Common Header> [ <INTEGRITY> ]
                          [ [<MESSAGE_ID_ACK> | <MESSAGE_ID_NACK>] ... ]
                          [ <MESSAGE_ID> ]
                          <SESSION> <RSVP_HOP>
                          <TIME_VALUES>
                          [ <EXPLICIT_ROUTE> ]
                          <LABEL_REQUEST>
                          [ <PROTECTION> ]
                          [ <LABEL_SET> ... ]
                          [ <SESSION_ATTRIBUTE> ]
                          [ <NOTIFY_REQUEST> ]
                          [ <ADMIN_STATUS> ]
                          [ <POLICY_DATA> ... ]
                          <sender descriptor>
<sender descriptor> ::=   <SENDER_TEMPLATE> <SENDER_TSPEC> <U_TSPEC>
                          [ <ADSPEC> ] [ <U_ADSPEC> ]
                          [ <RECORD_ROUTE> ]
                          [ <SUGGESTED_LABEL> ]
                          [ <RECOVERY_LABEL> ]
                          <UPSTREAM_LABEL>
```

```
<Resv Message> ::=        <Common Header> [ <INTEGRITY> ]
                          [ [<MESSAGE_ID_ACK> | <MESSAGE_ID_NACK>] ... ]
                          [ <MESSAGE_ID> ]
                          <SESSION> <RSVP_HOP>
                          <TIME_VALUES>
                          [ <RESV_CONFIRM> ]  [ <SCOPE> ]
                          [ <NOTIFY_REQUEST> ]
                          [ <ADMIN_STATUS> ]
                          [ <POLICY_DATA> ... ]
                          <STYLE> <flow descriptor list>
<flow descriptor list> ::=
          <FLOWSPEC>  <FILTER_SPEC> <LABEL> <U_FLOWSPEC>  <U_FILTER_SPEC>
```

FIG_6

METHOD FOR SETTING UP A TWO-DIRECTIONAL CONNECTION

The invention relates to setting up a two-directional connection between an initiator node and a terminator node in a communication network with an Internet Protocol (IP) control plane, particularly to set up an asymmetric connection.

Remember that the control plane for a network denotes a physical or logical entity that is logically or physically separate from the data plane. The control plane performs signaling and routing functions. The data plane performs data flow transport functions for network users. An IP control plane denotes the capability of network elements to exchange control traffic using an IP protocol stack. A communication network with an IP control plane benefits from the flexibility and universality of existing techniques in terms of IP packets, for example addressing and routing.

IP/MPLS and GMPLS label switching techniques have been developed to provide unified control over networks for which the data plane uses various physical layer protocols and/or technologies and to perform advance traffic engineering, using an IP control plane. In particular, reservation of resources by signaling messages, for example using the RSVP or RSVP-TE protocol, provides a means of setting up connections or virtual circuits with control over characteristics in terms of service quality or other.

In accordance with the Request For Comment 3471, an initiator node denotes an RSVP host capable of starting setup of a label switching path (LSP) with a PATH message and a terminator node denotes an RSVP host that can form an opposite end of the LSP and reply to a PATH message by an RESV message.

In the context of the GMPLS family developed by the IETF, a two-directional connection may be set up either in the form of two independent single directional connections, or in the form of a symmetric two-directional connection. This second possibility has advantages described in section 4 of the Request For Comment 3471 published by the IETF.

It would be desirable to be able to benefit from at least some of these advantages for setting up an asymmetric connection. Such an attempt has been made by Dube and Costa in a proposal submitted to the IETF in November 2002 "two-directional LSPs for classical MPLS". Apart from semantic problems, this proposal does not provide a satisfactory solution due to the obligation made on RSVP hosts to effectively reserve communication resources for the up flow before sending the PATH message to the terminator node. The result is a relatively high risk that the attempt to set up a two-directional LSP will fail, for example in situations in which resource availability is poor, unbalanced load on network nodes or heterogeneity of switching nodes or routers. If it fails, the reservation procedure must be restarted from the beginning, which introduces a waiting time and inefficiently consumes resources of the control plane.

One purpose of the invention is to set up a two-directional connection particularly including an asymmetric connection with a single exchange of signaling messages between the initiator node and the terminator node, and with the best probability of success.

To achieve this, the invention provides a method of setting up a two-directional connection between an initiator node and a terminator node in a communication network with an IP control plane, comprising steps of:

producing a first traffic descriptor for a down data flow to be transmitted by the initiator node to the terminator node and a second traffic descriptor for an up data flow to be received by the initiator node from the terminator node, sending an open connection message comprising the first traffic descriptor and the second traffic descriptor from the initiator node to the terminator node along a connection path in said network, receiving said open connection message at an intermediate node on the connection path, evaluating communication resources of the intermediate node available for said down flow and said up flow, updating the content of said open connection message as a function of said available communication resources and transmitting said updated open connection message from the intermediate node to the terminator node along the connection path, receiving said open connection message at the terminator node, producing a third traffic descriptor for said down flow and a fourth traffic descriptor for said up flow depending on the content of the updated open connection message, and sending a reservation message comprising the third traffic descriptor and the fourth traffic descriptor from the terminator node to the initiator node along the connection path, and reserving communication resources for the down flow as a function of the third traffic descriptor and communication resources for the up flow as a function of the fourth traffic descriptor along the connection path.

According to one particular embodiment, the intermediate node updates at least either the first or the second traffic descriptor, depending on said available communication resources.

Advantageously, the intermediate node updates a section of an open connection message dedicated to the characteristics of the connection path as a function of said available communication resources. For example, this section contains an ADSPEC and/or U_ADSPEC object.

According to another particular embodiment, the intermediate node updates said open connection message by adding information about said available communication resources. For example, this information may include a list of labels denoting available resources, particularly in the form of a LABEL SET or UPSTREAM LABEL SET object.

Preferably, the open connection message is a PATH message in the RSVP protocols family and the reservation message is an RESV message in the RSVP protocols family.

Advantageously, the intermediate node receiving the open connection message performs the steps of:

preparing a reservation of first communication resources of the intermediate node for said up flow as a function of said first traffic descriptor and the availability of communication resources of the intermediate node for said connection, preparing a reservation of second communication resources of the intermediate node for said down flow as a function of said second traffic descriptor and the availability of communication resources of the intermediate node for said connection.

The invention also provides a communication device for a communication network with an IP control plane, comprising:

communication resources to transfer data in said network, a signaling controller capable of receiving an open connection message comprising a first traffic descriptor for a down data flow to be transmitted by an initiator node to a terminator node and a second traffic descriptor for an up data flow to be transmitted by the terminator node from the initiator node, and an admission controller capable of evaluating communication resources of the communication device available for said down flow and said up flow as a function of the first and second traffic descriptors, said signaling controller being capable of producing an updated open connection message as a function of said received open connection message and said available communication resources and transmitting said updated open connection message to the terminator node.

According to one particular embodiment, said signaling controller is capable of modifying at least either the first or second traffic descriptor as a function of said available communication resources.

Advantageously, said signaling controller is capable of modifying a section of the open connection message dedicated to characteristics of a connection path between the initiator node and the terminator node as a function of said available communication resources.

Preferably, said signaling controller is capable of receiving a reservation message comprising a third traffic descriptor and a fourth traffic descriptor in response to said updated open connection message and said admission controller is capable of reserving communication resources for the down flow as a function of the third traffic descriptor and communication resources for the up flow as a function of the fourth traffic descriptor.

The invention also provides a communication device for a communication network with an IP control plane, comprising communication resources to transfer data in said network and a signaling controller capable of receiving an open connection message comprising a first traffic descriptor for a down data flow to be transmitted by an initiator node to said communication device and a second traffic descriptor for an up data flow to be transmitted by the communication device to the initiator node, and an admission controller capable of producing a third traffic descriptor for the down data flow as a function of the first traffic descriptor and communication resources of the communication device available for the down flow, and a fourth traffic descriptor for the up data flow as a function of the second traffic descriptor and communication resources of the communication device available for the up flow, said signaling controller being capable of transmitting a reservation message comprising the third traffic descriptor and the fourth traffic descriptor to be sent to the initiator node.

The invention will be better understood and other purposes, details, characteristics and advantages will become clearer after reading the following description of several particular embodiments of the invention, given solely for illustrative and non-limitative purposes with reference to the appended drawings. On these drawings:

Figure 1:
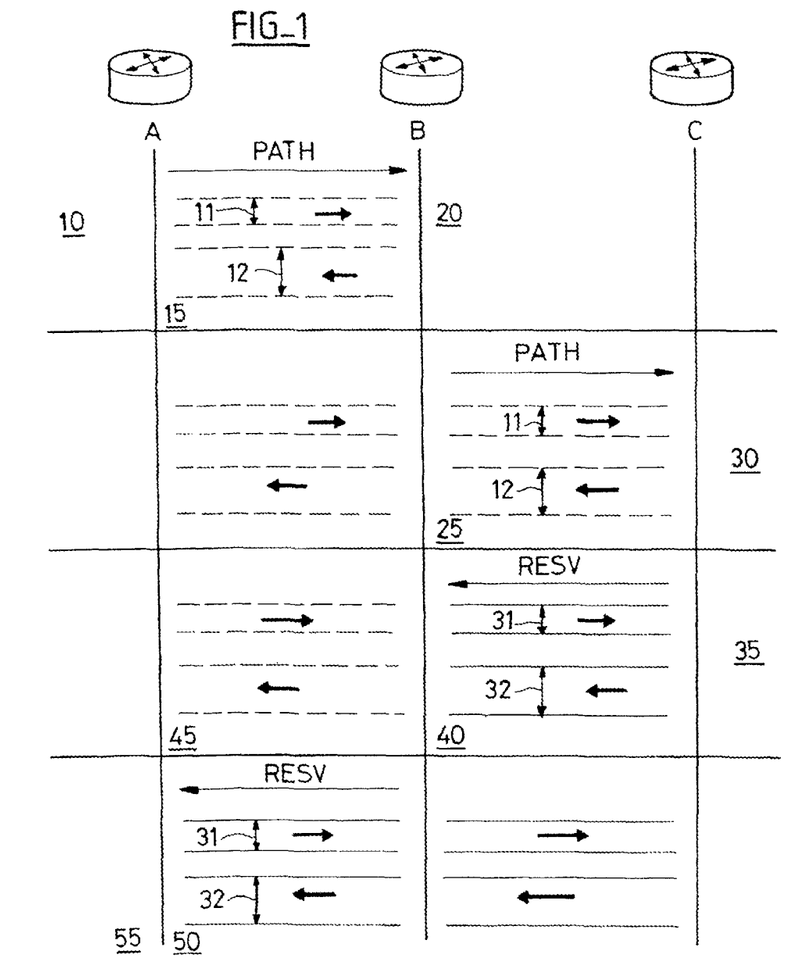
FIG. 1 represents the steps in a method to set up a two-directional LSP according to one embodiment of the invention.

FIG. 1 diagrammatically shows three nodes A, B and C in a network with an IP/MPLS or GMPLS control plane. For example, nodes A, B and C are IP/MPLS routers. The nature of the links and physical interfaces between the nodes may be arbitrary. The topology and extent of the network may be arbitrary, particularly the number of intermediate nodes may be higher or lower than that shown in FIG. 1.

We will now describe how to set up a two-directional LSP for a communication session between nodes A and C, as an example. It is assumed that the signaling controller (RSVP host) of node A has received a request to setup a two-directional connection with node C, for example from an application or from a network management system. A routing controller has calculated a route for this connection using routing methods that will not be described herein. The calculated route passes through node B. The lines in the table in FIG. 1 represent transfers of successive signaling messages to set up this connection.

In step 10, the node A signaling controller determines the characteristics of the connection to be set up in the down direction that means the transmission from A to C, and in the up direction that means the transmission from C to A. These characteristics are treated independently by signaling controllers and can therefore be identical to set up a symmetric connection, or different to set up an asymmetric connection. For example, these characteristics may be specified by the application or by the network management system that requests the connection. Starting from these characteristics, the node A signaling controller forms an SENDER_TSPEC object that is a traffic descriptor for the down flow and a U_TSPEC object that is a traffic descriptor for the up flow. These traffic descriptors form a characterization, at a more or less detailed level, of resources that the node A signaling controller would like to see assigned to the connection in each direction. The node A signaling controller then forms a PATH signal message comprising these two objects among others, and sends it to the next hop, which in this case is node B in step 15.

Figure 2:
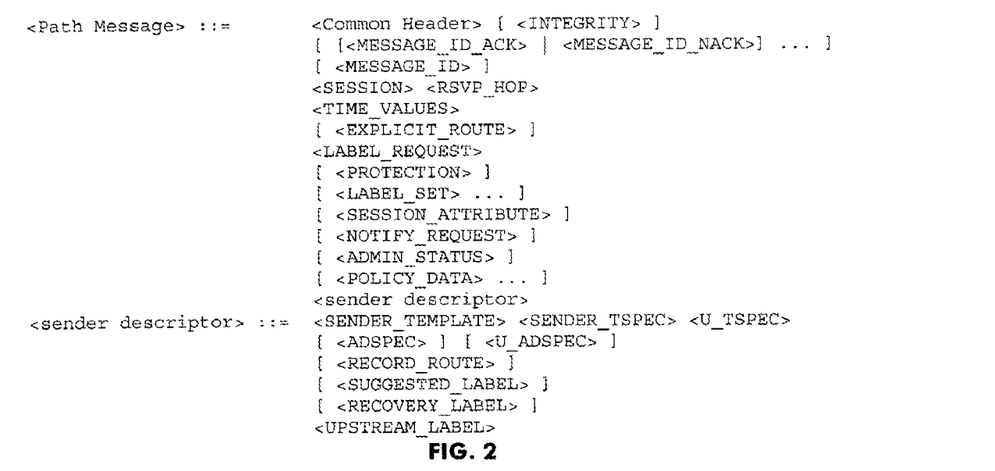
FIG. 2 is a summary view of a PATH message used in the method in FIG. 1.

FIG. 2 gives an example of a format that can be used for the PATH message. The square brackets denote optional objects. Apart from the U_TSPEC and U_ADSPEC objects, this format corresponds to RFC 3473. The ADSPEC and U_ADSPEC objects are connection path descriptors that are set up and updated by nodes processing the PATH message so as to specify the characteristics of elements forming the connection path, as explained in RFC 2210. In this case, the ADSPEC object is dedicated to the characteristics of the connection path in the down direction and the U_ADSPEC object is dedicated to the characteristics of the connection path in the up direction.

Figure 3:
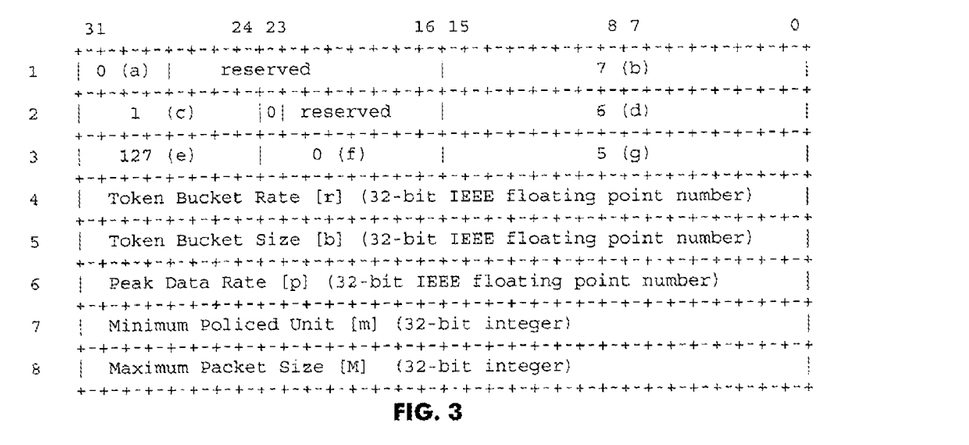
FIG. 3 is an example traffic descriptor used in the message in FIG. 2.

FIG. 3 shows an example format that can be used for the SENDER_TSPEC and U_TSPEC objects. This format corresponds to a packet type network in which the service quality is controlled within the framework defined by the RFC 2210. The content of traffic descriptors depends on the nature of low layers of the network. Other traffic parameters may be used depending on possibilities made available by the network. For example, the RFC 3946 defines traffic parameters for an SONET/SDH physical layer. The "MEF Ethernet Traffic Parameters" proposal submitted by Papadimitriou to the IETF in April 2006 defines traffic parameters for an Ethernet network. In FIG. 1, the value of traffic parameters carried in the signaling messages is shown symbolically by a passage section diameter 11 for the down connection and a passage section diameter 12 for the up connection.

Figure 7:
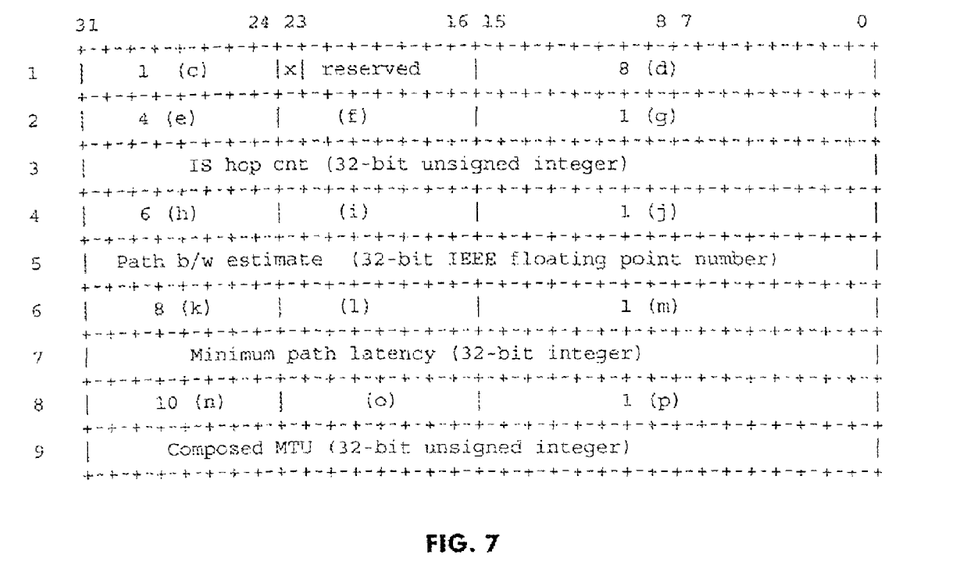
FIG. 7 is an example of a connection path descriptor used in the message in FIG. 2.

FIG. 7 gives an example format that can be used for the ADSPEC and U_ADSPEC objects. This format corresponds to a packet type network in which the service quality is controlled within the framework defined by RFC 2210. The content of connection path descriptors may also be adapted depending on the nature of the network low layers.

In step 20, the node B signaling controller receives the PATH message and processes its content using standard procedures, particularly by creating a record in a table called Path State Block. Furthermore, the SENDER_TSPEC and U_TSPEC traffic descriptors are passed onto a node B admission controller that verifies if the communication resources of the node are sufficient in each direction to set up a connection with the required characteristics.

If the available resources correspond to the requested characteristics in one direction, the admission controller pre-reserves these resources in the control plane so that they are not considered available for subsequent connection requests. However, these resources are not allocated in the data plane until the node receives an RESV reservation message corresponding to the PATH message. For example, this means that physical switchings in the node or pre-emption of resources that are currently being used for a flow with a lower priority than the requested new connection are not made until the RESV reservation message is received. Communication resources pre-reserved in the control plane are represented in FIG. 1 symbolically by a passage drawn with a dashed line. Communication resources allocated in the data plane are shown in FIG. 1 symbolically by a passage drawn with a solid line. An arrow indicates the transmission direction concerned in each case.

The node B signaling controller updates the contents of the PATH signal message and sends it at the next hop, which in this case is node C, in step 25. In the PATH message, the UPSTREAM_LABEL object is updated by node B to specify the interface that it wants to use for the up flow. In the example in FIG. 1, available resources are assumed to be sufficient in the two directions. For example, traffic parameters 11 and 12 carried in the signal message may be unchanged. If the ADSPEC and U_ADSPEC objects are used, the node B signaling controller updates their content as a function of the characteristics of the node, for example in terms of waiting time, pass band or service availability.

If the available resources are incapable of achieving the traffic characteristics requested in one direction, the admission controller pre-reserves the resources to the extent of their availability. This case will be described with reference to FIG. 6.

In step 30, the signaling controller of the terminator node C receives the PATH message and processes its content using standard procedures, particularly by creating a record in the table called Path State Block. The SENDER_TSPEC and U_TSPEC traffic descriptors and possibly the ADSPEC and U_ADSPEC connection path descriptors are passed onto a node C admission controller.

In step 35, the admission controller verifies firstly if the communication resources of node C are sufficient to set up a connection with the characteristics specified by the traffic descriptors, and secondly if applicable, if the characteristics of the connection path in each direction are sufficient to set up the connection with the characteristics specified by the traffic descriptors.

If the characteristics of the connection path and also the available resources of node C correspond to the requested characteristics in one direction, the admission controller effectively reserves these resources, also allocating these resources in the data plane.

If the characteristics of the connection path or the available resources of node C are not sufficient to achieve the requested traffic characteristics in one direction, the admission controller determines the most limitative characteristics and reserves the resources of node C to the extent of the characteristics of the connection that can effectively be set up in each direction.

In other words, the admission controller of node C determines the characteristics of the connection that can effectively be set up in each direction as a function of information contained in the PATH message, particularly the two SENDER_TSPEC and U_TSPEC traffic descriptors and the ADSPEC and U_ADSPEC connection path descriptors, if applicable, and available communication resources in node C, and it passes the corresponding information onto the signaling controller. The node C signaling controller uses this information to form a FLOWSPEC object that is a traffic descriptor for the down flow and an U_FLOWSPEC object that is a traffic descriptor for the up flow. These traffic descriptors form a characterization of resources that the node C admission controller has decided to allocate to the connection in each direction. These traffic descriptors may coincide with the values of parameters contained in the SENDER_TSPEC and U_TSPEC objects, or they may be different. In particular, they may specify traffic parameters at a level lower than that initially requested by the initiator node, for example in terms of dataflow.

The node C signaling controller then forms an RESV signaling message, including these two objects among others, and sends it to the next hop which in this case is node B, in step 40. In the example shown in FIG. 1, the available resources are assumed to be sufficient in both directions. The traffic parameters 31 and 32 carried by traffic descriptors of the RESV message may for example be identical to those specified in the PATH message. The RESV message is also used to distribute labels denoting the interfaces to be used by nodes for connection in each direction.

Figure 4:
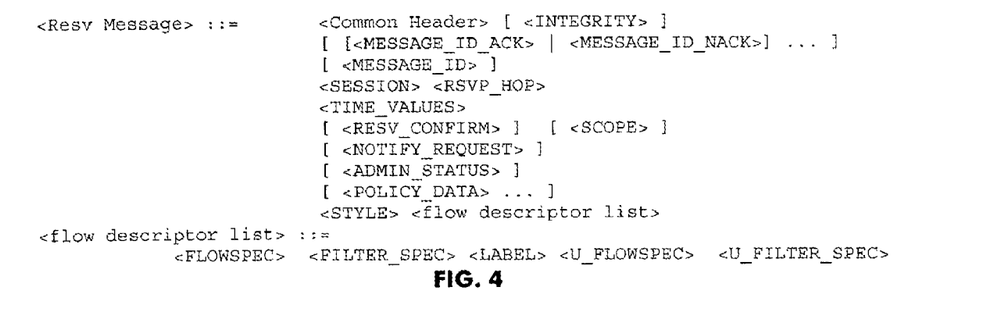
FIG. 4 is a summary representation of an RESV message used in the method in FIG. 1.

FIG. 4 shows an example format that can be used for the RESV message. Apart from the U_FLOWSPEC and U_FILTER_SPEC objects, this format corresponds to RFC 3473. The FILTER_SPEC object and the U_FILTER_SPEC object define a sub-set of packets of the communication session in the up and down directions respectively, that must benefit from the characteristics specified in the FLOWSPEC and U_FLOWSPEC descriptors respectively.

Figure 5:
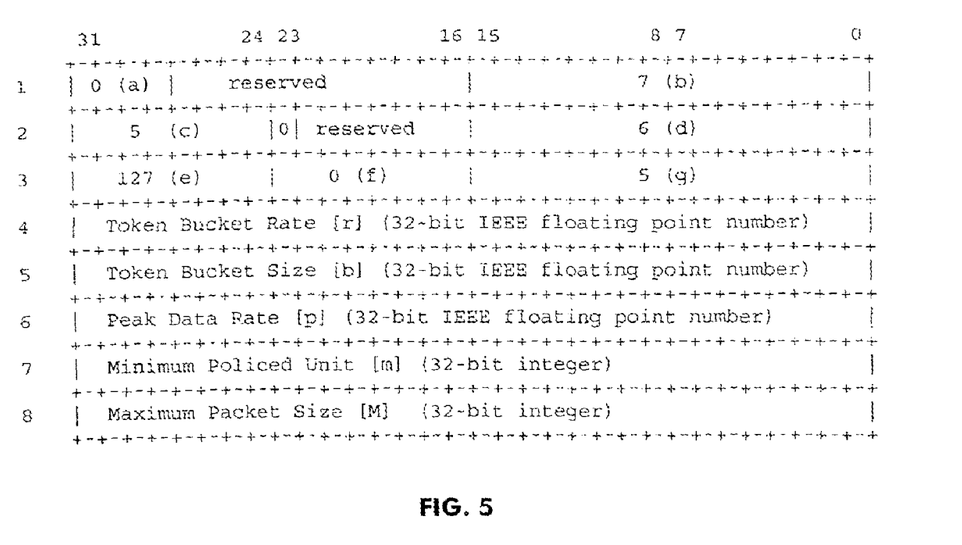
FIG. 5 is an example traffic descriptor used in the message in FIG. 4.

FIG. 5 shows an example format that can be used for the FLOWSPEC and U_FLOWSPEC objects. This format corresponds to a packet type network in which the service quality is controlled within the framework defined by the RFC 2210.

In step 45, the signaling controller of the intermediate node B receives the RESV message and processes its content. The signaling controller updates the switching tables as a function of the received labels. The FLOWSPEC and U_FLOWSPEC traffic descriptors are passed onto the node B admission controller that terminates the reservation of resources and their allocation in the data plane in accordance with the values of traffic parameters carried in traffic descriptors. Thus, the quantity of reserved resources may be equal to or less than the quantity of pre-reserved resources. Therefore, a pre-reserved resource is released if it is not necessary to set up the connection in accordance with the FLOWSPEC or U_FLOWSPEC traffic descriptor.

The node B signaling controller then updates the content of the RESV signaling message and sends it to the previous hop which in this case is the initiator node A, in step 50.

In step 55, the signaling controller of the initiator node A receives the RESV message and processes its content. The signaling controller updates the switching tables as a function of the received labels. The FLOWSPEC and U_FLOWSPEC traffic descriptors are passed onto the node A admission controller, that terminates the reservation of resources and their allocation in the data plane in accordance with the values of traffic parameters carried in the traffic descriptors. Thus, the quantity of reserved resources may be equal to or less than the quantity of pre-reserved resources at the time that the PATH message was sent. Therefore, a pre-reserved resource is released if it is not necessary to set up the connection in accordance with the FLOWSPEC or U_FLOWSPEC traffic descriptor.

According to known techniques, the signaling controller of the initiator node A also sends a confirmation message to the terminator node C on reception of the RESV message and then periodic refreshment messages to maintain the resource reservation.

Figure 6:
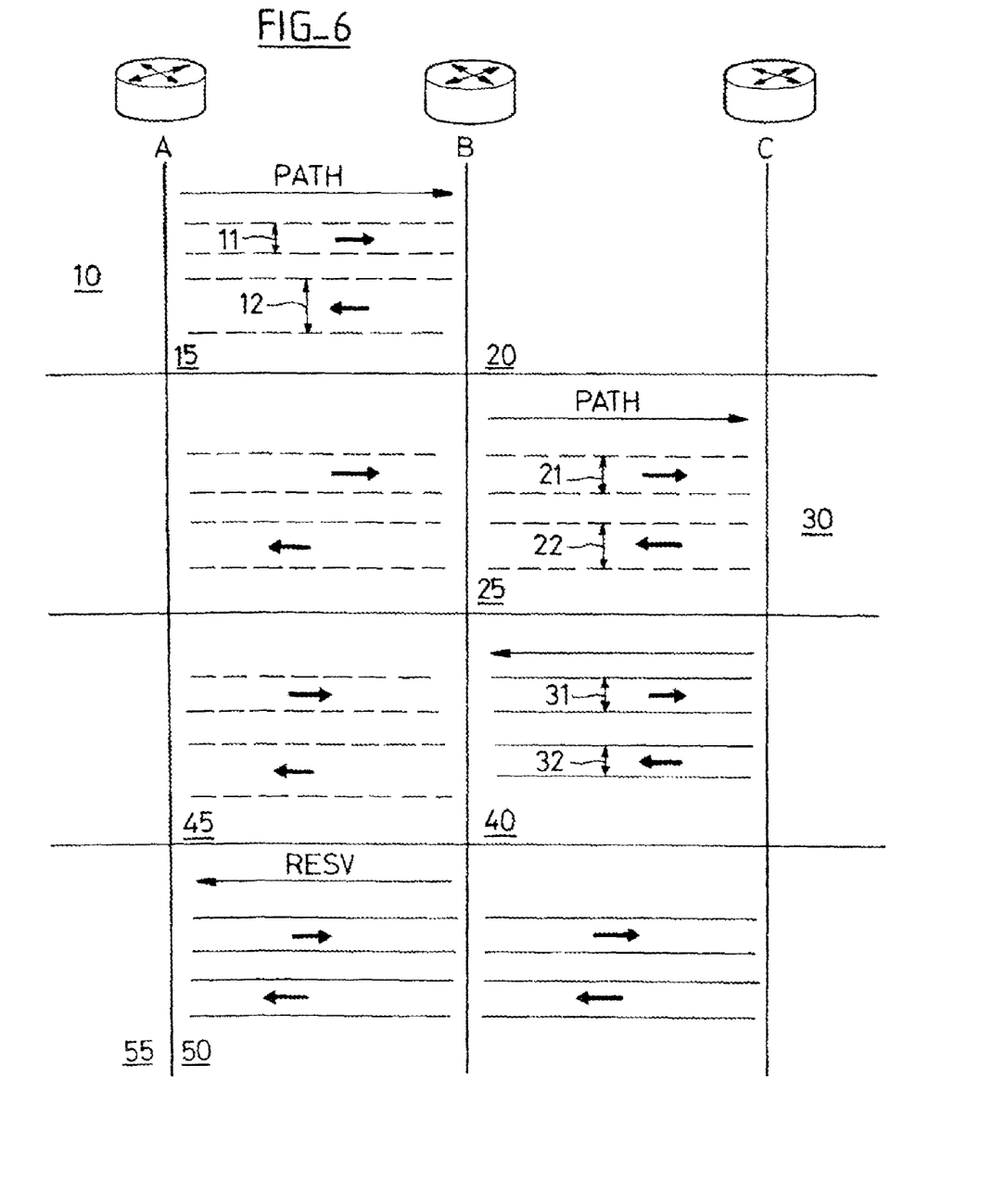
FIG. 6 is a diagram similar to FIG. 1 corresponding to a situation in which the set up connection message request cannot be fully satisfied by an intermediate node.

With reference to FIG. 6, we will now describe the case in which the traffic characteristics requested by the initiator node cannot be satisfied by the network. The same reference numbers as in FIG. 1 are used to denote identical or equivalent steps. In this case in step 20, the node B admission controller detects that available resources cannot satisfy the requested traffic characteristics in at least one direction, for example in the up direction. The admission controller re-evaluates the allowable traffic characteristics in the up direction as a function of actually available communication resources at node B, makes the corresponding pre-reservation and passes corresponding information onto the node B signaling controller.

According to a first embodiment, the node B signaling controller is capable of updating traffic descriptors in the PATH message as a function of information provided by the admission controller about available communication resources. Therefore, the PATH message is sent in the next hop with one or several modified traffic parameters 21 and 22 at least for one communication direction, namely the modified parameters contained in the U_TSPEC object in this example. The remainder of the procedure is then the same as the previous description. Thus, if the terminator node C does not introduce any additional limitations, traffic descriptors in the RESV message will have the same values of parameters as in the PATH message, as indicated by the arrows 31 and 32. This embodiment may be executed using optional objects or without using them. In all cases, limitations of each intermediate node B are used to define connection characteristics to be set up in each direction, such that the probability of success is better than it is with more rigid methods according to prior art. This embodiment does not prevent the terminator node C admission controller from finally being able to put traffic parameters with values different from those transmitted by an intermediate node B into the RESV message, as explained above.

According to a second embodiment, the node B signaling controller is incapable of updating the SENDER_TSPEC and U_TSPEC traffic descriptors in the PATH message. In this case, the information supplied by the admission controller about available communication resources is passed on to the next hop, as characteristics of the connection path in the ADSPEC or U_ADSPEC object, so that they can be used by the terminator node C admission controller during determination of the FLOWSPEC or U_FLOWSPEC traffic descriptor.

In other words, this second embodiment consists of passing traffic descriptors and descriptors of the connection path currently being built, in parallel, onto the next hop. In this case, the terminator node is responsible for making correspondence calculations between firstly effectively available connection resources as specified by the connection path descriptors, and secondly desired connection resources as specified by traffic descriptors and consequently determining the extent to which the connection request can be satisfied, as explained in step 35. The first embodiment offers additional flexibility to the extent that an intermediate node is capable of modifying the traffic descriptors, which is equivalent to modifying the connection request.

The parameters contained in the U_TSPEC, U_ADSPEC and U_FLOWSPEC objects may be identical, for example see FIGS. 3 and 5, or they may be different, for example see FIGS. 5 and 7. The terminator node C admission controller is capable of making the necessary calculations and conversions to formulate traffic parameters in the format of the U_FLOWSPEC traffic descriptor depending on the traffic parameters received in the format of the U_TSPEC traffic descriptor and characteristics of the connection path received in the format of the U_ADSPEC connection path descriptor. The same comment is applicable for objects associated with the down direction.

The two-directional nature of the set up connection request is preferably notified by the presence of the UPSTREAM_LABEL object in the PATH message. Advantageously, the UPSTREAM_LABEL_SET object is also used to further improve the probability of success of the request, as described in the Eiji Oki et al. publication, IEICE TRANS. COMMUN., Vol. E87-B, No 6, June 2004.

Objects contained in signaling messages are formed in one or several predefined formats that can be read by other nodes in the MPLS domain. Obviously, formats and names of variables used in this description are purely illustrative. These names and formats could be governed by different conventions. Preferably, the names and formats are chosen so as to have backwards compatibility with existing standards.

Figure 8:
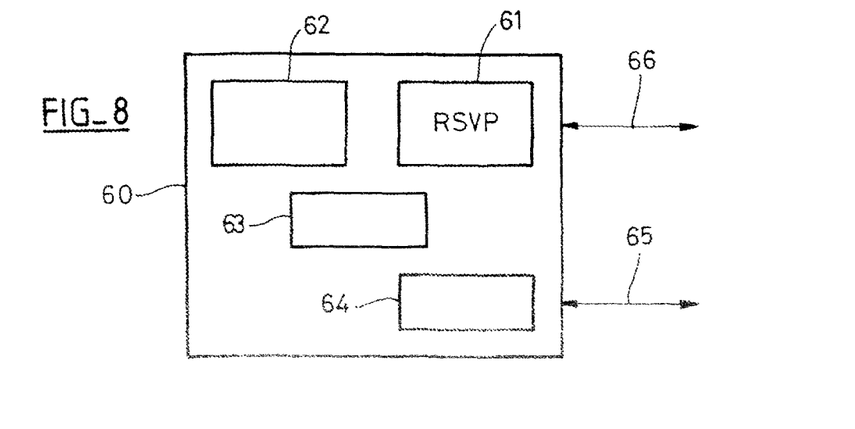
FIG. 8 is a functional diagram of an IP/MPLS router according to one embodiment of the invention.

FIG. 8 shows an example of a functional IP/MPLS or GMPLS router architecture to create nodes A, B and C. The router 60 comprises a signaling controller 61 communicating with the other network elements through control channels 66, a routing controller 62, an admission controller 63, and a traffic controller 64 communicating with the other network elements through data channels 65. The traffic controller 64 is responsible for transferring data packets as a function of labels. The data channel 65 and the control channel 66 may be made on common or distinct interfaces.

Data exchanges in networks are frequently asymmetric. The methods described above take advantage of the two-directional capacities of the GMPLS infrastructure and extend it to satisfy asymmetric pass band requests. They are applicable to all segments of the network (access, metropolitan and core) and enable optimizations that are particularly important in critical areas close to final users, such as access segments in which traffic is often highly asymmetric. For example, broadcast television and video on demand VoD services generate strongly asymmetric flows on these segments. Down flows are composed of video data sent to users, while up flows are composed essentially of signaling message associated with the service (request film, change channel, etc.)

The asymmetry of the connection obtained can apply to the pass band, the switching technique, the data encoding technique or other characteristics of the connection.

The methods described above are based on the RSVP-TE protocol. However, they could be used with other signaling protocols with equivalent functions.

Some of the described elements, particularly signaling, routing and admission controllers, may be made in different forms, either unit or distributed, using hardware and/or software components. Hardware components that can be used include application specific integrated circuits ASIC, programmable logical networks FPGA or microprocessors. Software components may be written in different programming languages, for example C, C++, Java or VHDL. This list is not exhaustive. Several controllers may be represented by a single hardware element.

A network management system may be hardware equipment, for example a microcomputer, a work station, an instrument connected to the internet or any other dedicated communication device or general purpose device. Software programs run by this system perform network management functions to control network elements.

Communication resources generally encompass all physical or logical elements that can be mobilized by the network to transfer traffic. Depending on the nature of physical layers and control layers for access to the MAC support in nodes, in particular communication resources can denote elements such as the CPU time, memory space, registers, logical or physical ports, radio or optical channels, time intervals and others.

Although the invention has been described with reference to several particular embodiments, it is quiet obvious that it is in no way limited by them, and it includes all technical equivalents of the described means and combinations of them provided that these combinations are within the framework of the invention.

Use of the verbs "comprise", "contain" or "include" and conjugated forms of them does not exclude the presence of other elements or other steps not mentioned in a claim. The use of the indefinite article "a" or "an" for an element or a step does not exclude the presence of a plurality of such elements or steps, unless mentioned otherwise.

Any reference figure placed between parentheses shall not be interpreted as being a limitation of the claim, in the following claims.

The invention claimed is:

1. Method of setting up a two-directional connection between an initiator node (A) and a terminator node (C) in a communication network with an IP control plane, comprising steps of:
    producing a first traffic descriptor (11) for a down data flow to be transmitted by the initiator node to the terminator node, and a second traffic descriptor (12) for an up data flow to be received by the initiator node from the terminator node,
    sending (15) an open connection message comprising the first traffic descriptor and the second traffic descriptor from the initiator node to the terminator node along a connection path in said network,
    receiving (20) said open connection message at an intermediate node (B) on the connection path,
    evaluating communication resources of the intermediate node available for said down flow and said up flow,
    updating the content of said open connection message as a function of said available communication resources and transmitting (25) said updated open connection message from the intermediate node to the terminator node along the connection path,
    receiving (30) said open connection message at the terminator node, producing a third traffic descriptor (31) for said down flow and a fourth traffic descriptor (32) for said up flow depending on the content of the updated open connection message, and sending (40) a reservation message comprising the third traffic descriptor and the fourth traffic descriptor from the terminator node to the initiator node along the connection path,
    and reserving (35, 45) communication resources for the down flow as a function of the third traffic descriptor and communication resources for the up flow as a function of the fourth traffic descriptor along the connection path.

2. Method according to claim 1, characterised by the fact that the intermediate node updates at least either the first or the second traffic descriptor (21, 22) depending on said available communication resources.

3. Method according to claim 1, characterised by the fact that the intermediate node updates a section of the open connection message dedicated to the characteristics of the connection path as a function of said available communication resources.

4. Method according to claim 1, characterised by the fact that the intermediate node updates said open connection message by adding information about said available communication resources.

5. Method according to claim 1, characterised by the fact that the open connection message is a PATH message in the RSVP protocols family and the reservation message is an RESV message in the RSVP protocols family.

6. Method according to claim 1, characterised by the fact that the intermediate node (B) receiving the open connection message performs the steps of:
    preparing (20) a reservation of first communication resources of the intermediate node for said up flow as a function of said first traffic descriptor and the availability of communication resources of the intermediate node for said connection,
    preparing (20) a reservation of second communication resources of the intermediate node for said down flow as a function of said second traffic descriptor and the availability of communication resources of the intermediate node for said connection.

7. Communication device (B) for a communication network with an IP control plane, comprising:
    communication resources (65) to transfer data in said network and a signaling controller (61) capable of receiving an open connection message comprising a first traffic descriptor (11) for a down data flow to be transmitted by an initiator node (A) to a terminator node (C) and a second traffic descriptor (12) for an up data flow to be transmitted by the terminator node from the initiator node, and an admission controller (63) capable of evaluating communication resources of the communication device available for said down flow and said up flow as a function of the first and second traffic descriptors, said signaling controller being capable of producing an updated open connection message as a function of said received open connection message and said available communication resources, and transmitting said updated open connection message to the terminator node.

8. Communication device according to claim 7, characterised by the fact that said signaling controller (61) is capable of modifying at least either the first or second traffic descriptor (21, 22) as a function of said available communication resources.

9. Communication device according to claim 7, characterised by the fact that said signaling controller (61) is capable of modifying a section of the open connection message dedicated to characteristics of a connection path between the initiator node and the terminator node as a function of said available communication resources.

10. Communication device according to claim 7, characterised by the fact that said signaling controller (61) is capable of receiving a reservation message comprising a third traffic descriptor (31) and a fourth traffic descriptor (32) in response to said updated open connection message and said admission controller is capable of reserving communication resources for the down flow as a function of the third traffic descriptor and communication resources for the up flow as a function of the fourth traffic descriptor.

11. Communication device (C) for a communication network with an IP control plane, comprising:
communication resources (65) to transfer data in said network,
a signaling controller (61) capable of receiving an open connection message comprising a first traffic descriptor (11, 21) for a down data flow to be transmitted by an initiator node (A) to said communication device and a second traffic descriptor (12, 22) for an up data flow to be transmitted by the communication device to the initiator node,
characterised by the fact that it comprises an admission controller (63) capable of producing a third traffic descriptor (31) for the down data flow as a function of the first traffic descriptor and communication resources of the communication device available for the down flow, and a fourth traffic descriptor (32) for the up data flow as a function of the second traffic descriptor and communication resources of the communication device available for the up flow,
said signaling controller being capable of transmitting a reservation message comprising the third traffic descriptor and the fourth traffic descriptor to be sent to the initiator node.

* * * * *